United States Patent
Zhu et al.

(10) Patent No.: US 9,821,331 B2
(45) Date of Patent: Nov. 21, 2017

(54) AUTOMATIC CONTROL ELEMENT WITH UNIFORMLY-DISTRIBUTED STEPPING FREQUENCY

(71) Applicant: JIANGSU UNIVERSITY, Zhenjiang, Jiangsu (CN)

(72) Inventors: Xingye Zhu, Jiangsu (CN); Junping Liu, Jiangsu (CN); Shouqi Yuan, Jiangsu (CN); Hong Li, Jiangsu (CN); Jianyuan Jiang, Jiangsu (CN); Xingfa Liu, Jiangsu (CN)

(73) Assignee: JIANGSU UNIVERSITY, Zhenjiang, Jiangsu (CN)

( * ) Notice: Subject to any disclaimer, the term of this patent is extended or adjusted under 35 U.S.C. 154(b) by 263 days.

(21) Appl. No.: 14/419,158

(22) PCT Filed: Nov. 18, 2013

(86) PCT No.: PCT/CN2013/087293
§ 371 (c)(1),
(2) Date: Feb. 2, 2015

(87) PCT Pub. No.: WO2015/066944
PCT Pub. Date: May 14, 2015

(65) Prior Publication Data
US 2016/0038956 A1  Feb. 11, 2016

(30) Foreign Application Priority Data
Nov. 5, 2013 (CN) .......................... 2013 1 0539490

(51) Int. Cl.
*B01F 5/06* (2006.01)
*B05B 7/04* (2006.01)
(Continued)

(52) U.S. Cl.
CPC ............ *B05B 7/0425* (2013.01); *A01G 25/00* (2013.01); *B01F 5/0498* (2013.01); *B01F 5/064* (2013.01);
(Continued)

(58) Field of Classification Search
CPC .... B05B 1/02; B05B 3/06; B05B 7/08; B05B 7/2445; B05B 15/0406; B05B 15/0425;
(Continued)

(56) References Cited

U.S. PATENT DOCUMENTS 749,645 A * 1/1904 Tuttle ........................ G01F 5/00
137/599.12
2,707,021 A * 4/1955 Harris ....................... F02C 7/22
137/110
(Continued)

FOREIGN PATENT DOCUMENTS

CN  2659553 Y  12/2004
CN  101224444 B  7/2011
CN  101972722 B  4/2013

*Primary Examiner* — Alexander Valvis
(74) *Attorney, Agent, or Firm* — Novick, Kim & Lee, PLLC; Allen Xue (57) ABSTRACT

An automatic control element has a sprinkler, a fluidic element connected to the sprinkler, and an outlet cover plate secured onto an outlet of the fluidic element. The fluid element further has a water inlet and a first air supply pore are symmetrically arranged on it. A second air supply pore is on the water inlet. A water distributor is formed on the sprinkler, a water tank is provided on the outer side of the sprinkler, and the water distributor is in communication with an inner cavity of the water tank. A signal nozzle is provided on the wall of the water tank, and the signal nozzle is connected to the water inlet via a conduit.

16 Claims, 8 Drawing Sheets

(51) Int. Cl.
*B01F 5/04* (2006.01)
*B05B 3/06* (2006.01)
*A01G 25/00* (2006.01)

(52) U.S. Cl.
CPC .......... *B05B 3/06* (2013.01); *Y10T 137/2562* (2015.04); *Y10T 137/87265* (2015.04); *Y10T 137/87346* (2015.04)

(58) Field of Classification Search
CPC ............ E03C 1/084; Y10T 137/87346; Y10T 137/2562; Y10T 137/87265; B01F 5/0498; B01F 5/064
USPC .... 239/109, 124, 125, 225.1, 243, 246–249, 239/289, 310, 311, 317, 318, 335, 419.5, 239/428, 428.5, 433, 434, 565, 425.5; 137/89, 110, 512.1, 599.02, 599.11, 137/599.12, 600, 625.28, 888–894; 222/109, 318, 424
See application file for complete search history.

(56) References Cited

U.S. PATENT DOCUMENTS

| | | | | |
|---|---|---|---|---|
| 3,739,794 A | * | 6/1973 | Lindgren | B01F 5/0451 137/1 |
| 5,762,416 A | * | 6/1998 | LeSire | B01F 5/043 366/136 |
| 5,961,047 A | * | 10/1999 | Kleinberger | B05B 7/262 239/124 |
| 2016/0025117 A1 | * | 1/2016 | Engelhard | B01F 5/0423 137/9 |

* cited by examiner

AUTOMATIC CONTROL ELEMENT WITH UNIFORMLY-DISTRIBUTED STEPPING FREQUENCY

TECHNICAL FIELD

The present invention relates to critical equipment for controlling the stepping frequency of a fluidic sprinkler head in a sprinkling irrigation system, particularly to an automatic control element for maintaining uniform stepping frequency of a fluidic sprinkler head.

BACKGROUND OF THE PRESENT INVENTION

Fluidic sprinkler heads have been widely applied to irrigation in the agricultural area. At present, as the related patent applications, there are Fluidic Sprinkler Head (No. 03222424.9) and Wall-attached Fluidic Sprinkler Head (No. 200710134562.5). A fluidic sprinkler head generally has two states: direct jet and wall attachment. The switchover between the two states is adjusted by discontinuously intercepting signal water in a signal nozzle by a fluidic sprinkler head. The applicant(s) once submitted one patent, titled "External Water Jet Wall-attached Control Element" (No. 201010552792.5), where the control element includes a reverse air supply pore, an external water signal nozzle, an outlet cover plate, a conduit and a water inlet. The signal water or air taken from the external water signal nozzle intermittently forms a low pressure vortex area on one side of a main jet, and the reserve air supply pore is opened or closed to allow switchover between high pressure and low pressure on the other side of the main jet. Consequently, a pressure difference is formed between left and right sides of the main jet, and the wall attachment of water flow is thus realized. The wall-attached water flow impacts the chamfer of the outlet cover plate and generates a driving force to drive the sprinkler head to rotate, thereby realizing functions of direct jet, stepping and reverse rotation of the sprinkler head in an automatic control manner. This external water jet wall-attached control element operates stably and reliably, and the outlet cover plate may be designed into any shape.

However, as the signal water intercepted by the existing fluidic sprinkler heads is generally air-water mixture, the duration of direct jet or wall attachment of the fluidic sprinkler head is quite random every time, and there are disadvantages that the stepping frequency is not uniform and the duration of direct jet or wall attachment cannot be controlled accurately; furthermore, the existing fluidic sprinkler heads further have the disadvantage that they may fail to take signal water to complete the rotation action in some exceptional circumstances. This technical problem has become one of the main bottlenecks for the development of fluidic sprinkler heads. Therefore, developing an automatic control element which may ensure uniform stepping frequency of a fluidic sprinkler head is of great importance in promoting the development of irrigation agriculture.

SUMMARY OF THE PRESENT INVENTION

An objective of the present invention is to provide an automatic control element with uniformly-distributed stepping frequency, which overcomes the problems that a conventional fluidic sprinkler head has non-uniform stepping frequency and may fail to take signal water to complete the rotation action.

The present invention employs the following technical solution. An automatic control element with uniformly-distributed stepping frequency is provided, including a sprinkler and a fluidic element connected to the sprinkler, an outlet cover plate being secured onto an outlet of the fluidic element; a water inlet and a first air supply pore are formed symmetrically on the fluidic element, and a second air supply pore is formed on the water inlet; a water distributor is formed on the sprinkler, a water tank is provided on the outer side of the sprinkler, and the water distributor is in communication with an inner cavity of the water tank; and a signal nozzle is provided on the wall of the water tank, and the signal nozzle is connected to the water inlet via a conduit.

In the above solution, when the diameter of the water distributor is too small, the water distributer is likely to be blocked so that the fluidic sprinkler head cannot complete the rotation action; however, when the diameter of the water distributer is too large, the conduit cannot pump out signal water in the water tank so that the fluidic sprinkler head rotates continuously or rotates too fast. Therefore, the water distributor is designed to be an inclined straight shape, with the aperture thereof being $1/10$ to $1/4$ of that of a center hole of the sprinkler.

In the above solution, there may be various implementation solutions for mounting the sprinkler and the water tank. The solutions for mounting the sprinkler and the water tank will be described as below, respectively.

In one solution, threaded teeth are formed on the outer sidewall of the sprinkler, and threaded through holes are formed on both the upper and lower walls of the water tank. In this way, the sprinkler may be in threaded connection to the water tank. Practically, in order to ensure the sealing performance, on one hand, sealant may be coated at the threaded connection part between the sprinkler and the water tank; on the other hand, the threaded and sealed connection between the sprinkler and the water tank may be directly realized by self-sealed threads. Meanwhile, in order to better secure the position of the water tank, a first locking nut for securing the connection position of the sprinkler and the water tank may be screwed on the threaded teeth on the outer sidewall of the sprinkler.

In another solution, through holes are formed on both the upper and lower walls of the water tank, and the through holes on both the upper and lower walls of the water tank are brought to be in interference-fit connection to the outer sidewall of the sprinkler by technical means. In this way, no leakage of water flowing from the water distributor into the water tank will occur.

In yet another solution, through holes are formed on both the upper and lower walls of the water tank, limiting tooth slots are provided on the walls of the through holes on both the upper and lower walls of the water tank, and limiting teeth are correspondingly provided on the outer sidewall of the sprinkler, where the water tank is made of engineering plastics and the sprinkler is made of metal by means of smelting. Due to different hardness of the material of the water tank and the material of the sprinkler, the water tank may be in firmly sealed connection to the sprinkler via the limiting teeth by virtue of the elastic deformation of the plastics.

In the above three solutions for mounting the sprinkler and the water tank, the signal nozzle may be in fixed connection to the water tank via threads; meanwhile, a third locking nut for securing the connection position of the water tank and the signal nozzle is provided on the signal nozzle. Similarly, the sprinkler may be in connection to the fluidic element via threads too; meanwhile, a second locking nut for securing the connection position of the sprinkler and the fluidic element is screwed on the sprinkler.

In the above three solutions for mounting the sprinkler and the water tank, a chamfer is formed at the outlet of the outlet cover plate, and the outlet of the outlet cover plate may be in any shape, for example, may be square, circular, elliptic, ovaloid, etc.

The present invention may achieve the following technical effects: the structure is simple and the operating is stable; furthermore, the additional arrangement of one water tank on the sprinkler overcomes the defect of use of air-water mixture only as signal water in the prior art, and solves the problems that a fluidic sprinkler head has a stepping frequency not so uniform and may fail to take signal water to complete the rotation action.

in the drawings: 1-Water tank; 2-First locking nut; 4-Sprinkler; 5-Second locking nut; 7-Fluidic element; 8-Water inlet; 9-First air supply pore; 10-Outlet cover plate; 11-Water distributor; 13-Signal nozzle; 14-Third locking nut; 15-Conduit; 17-Signal hole; and, 19-Second air supply pore.

DETAILED DESCRIPTION OF THE PRESENT INVENTION

The technical solutions of the present invention will be described in more details as below with reference to the accompanying drawings.

Embodiment 1

Figure 1:
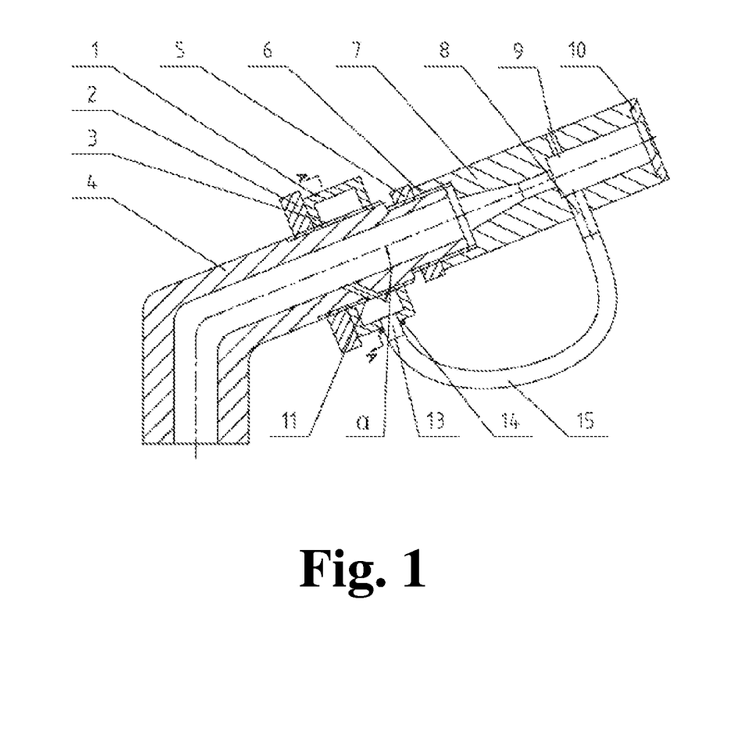
FIG. 1 is structure diagram of an automatic control element with uniformly-distributed stepping frequency according to Embodiment 1.
Figure 2:
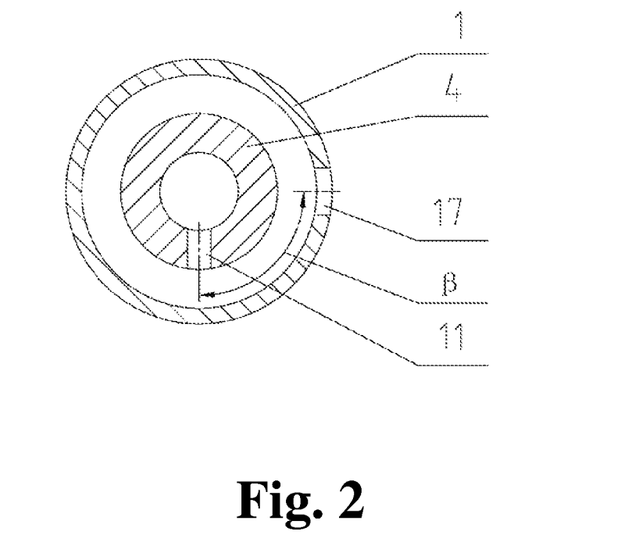
FIG. 2 is a sectional view of direction A of FIG. 1.
Figure 3:
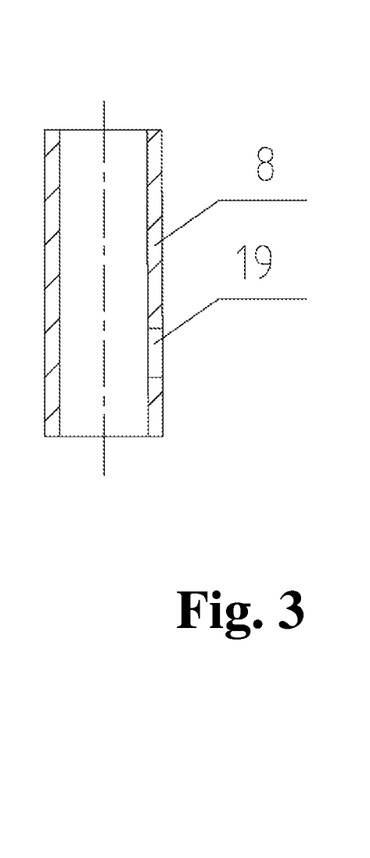
FIG. 3 is a schematic diagram of a water inlet of FIG. 1.
Figure 4:
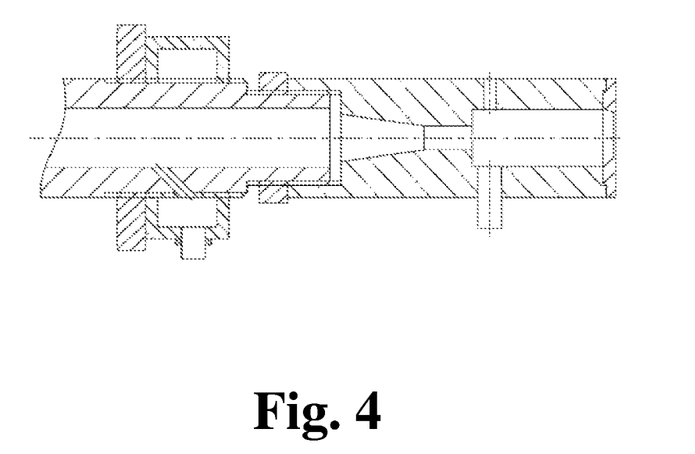
FIG. 4 is a schematic diagram of connection between a water tank, a fluidic element and a sprinkler as shown in FIG. 1.

As shown in FIG. 1, FIG. 2 and FIG. 4, an automatic control element with uniformly-distributed stepping frequency provided by this embodiment includes a sprinkler 4 and a fluidic element 7. Thread teeth are formed on the sprinkler 4, a threaded hole is formed on the fluidic element 7, and the sprinkler 4 is in threaded connection to the fluidic element 7. A second locking nut 5 for securing the connection position of the sprinkler 4 and the fluidic element 7 is provided at the connection part of the sprinkler 4 and the fluidic element 7. An outlet cover plate 10 is secured onto an outlet of the fluidic element 7. A chamfer is formed at the outlet of the outlet cover plate 10, and the shape of the outlet of the outlet cover plate 10 may be square, circular, elliptic, ovaloid or in any other shapes, preferably circular in this embodiment. A water inlet 8 and a first air supply pore 9 are formed symmetrically on the fluidic element 7, and the first air supply pore 9 is used for continuously supplying air from one side of the fluidic element 7, as shown in FIG. 3. A second air supply pore 19 is formed on the water inlet 8, and the second air supply pore 19 is used for discontinuously supplying air from the other side of the fluidic element 7. A water distributor 11 is formed on the bottom end of the sprinkler 4. The water distributor 11 is in an inclined straight shape and satisfies the following conditions: an included angle α between the hole center line of the water distributor 11 and the hole center line of the sprinkler 4 is less than or equal to 90°, and the aperture of the water distributor 11 is 1/10 to 1/4 of that of a center hole of the sprinkler 4. Threaded teeth are formed on the outer sidewall of the sprinkler 4, the water tank is a cylindrical water tank, and threaded through holes are provided on both the upper and lower wall of the water tank 1. In this way, the sprinkler 4 is connected to the water tank 1 via threads. It is to be noted that the mounting position of the water tank 1 has to ensure that the water distributor 11 may be in communication with an inner cavity of the water tank 1. Practically, in order to ensure the sealing performance, on one hand, sealant may be coated at the threaded connection part between the sprinkler 4 and the water tank 1; on the other hand, the threaded and sealed connection between the sprinkler 4 and the water tank 1 may also be directly realized by self-sealed threads. Meanwhile, in order to better secure the position of the water tank 1, a first locking nut 2 for securing the connection position of the sprinkler 4 and the water tank 1 may be tightly screwed on the threaded teeth on the outer sidewall of the sprinkler 4. A signal hole 17 which is a threaded hole is formed on the wall of the water tank 1, and threaded teeth are formed on the signal nozzle 13, so that the signal nozzle 13 is fixedly connected to the water tank 1 via threads. A third locking nut 14 for securing the connection position of the water tank 1 and the signal nozzle 13 is further provided on the signal nozzle 13. The signal nozzle 13 is connected to the water inlet 8 via a conduit 15. When the conduit 15 is connected to the water inlet 8, it is required to expose the second air supply pore 19, disposed on the water inlet 8, outside the conduit.

The fluidic element 7 has two working states: direct jet and stepping, specifically as follows.

Figure 5:
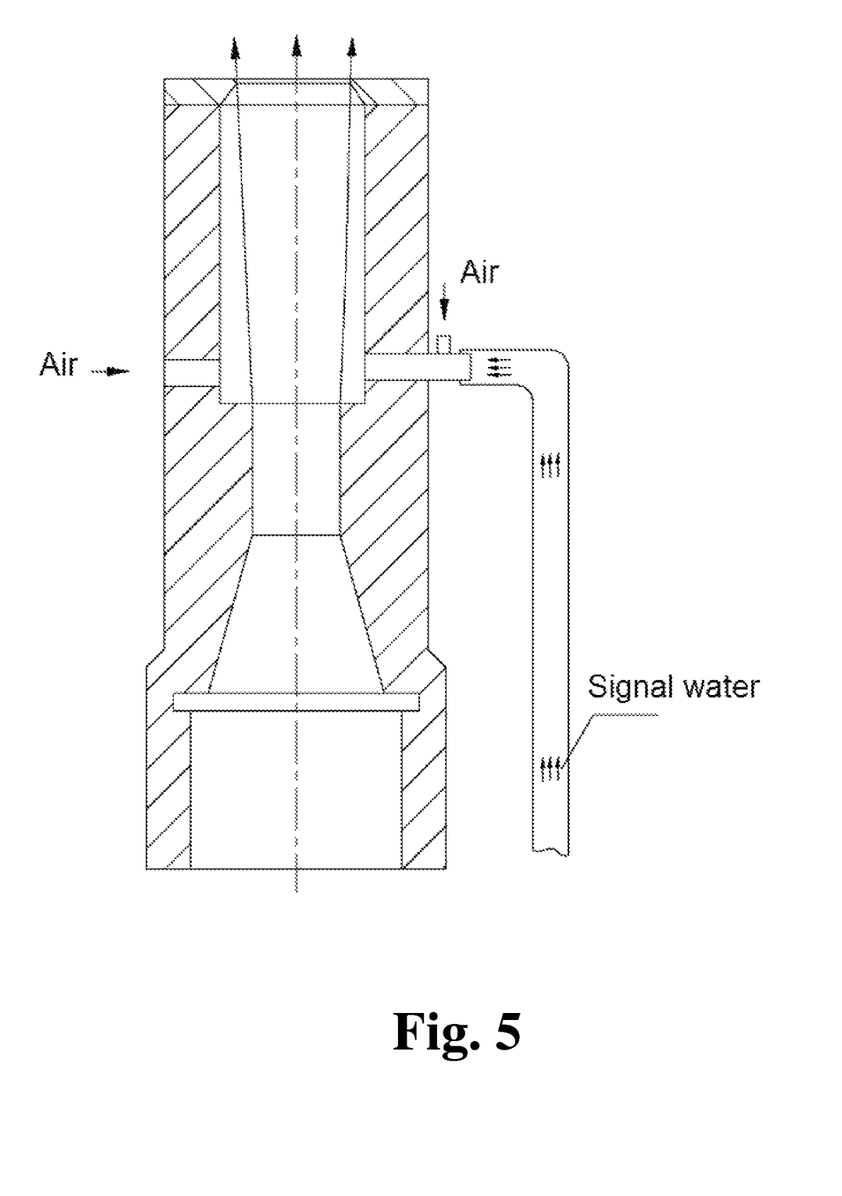
FIG. 5 is a schematic diagram of a direct jet state of a fluidic element.

Direct jet: as shown in FIG. 5, air is supplied from the left side of the fluidic element 7 by the first air supply pore 9, while from the right side of the fluidic element 7 by the second air supply pore 19 formed at the water inlet 8. Therefore, the pressure on the two sides is substantially equal, and the main jet is in the direct jet state while the sprinkler head keeps still. Meanwhile, running water in the sprinkler 4 flows into the water tank 1 along the water distributor 11, while the signal water in the water tank 1 then flows towards the water inlet 8 via the conduit 15.

Figure 6:
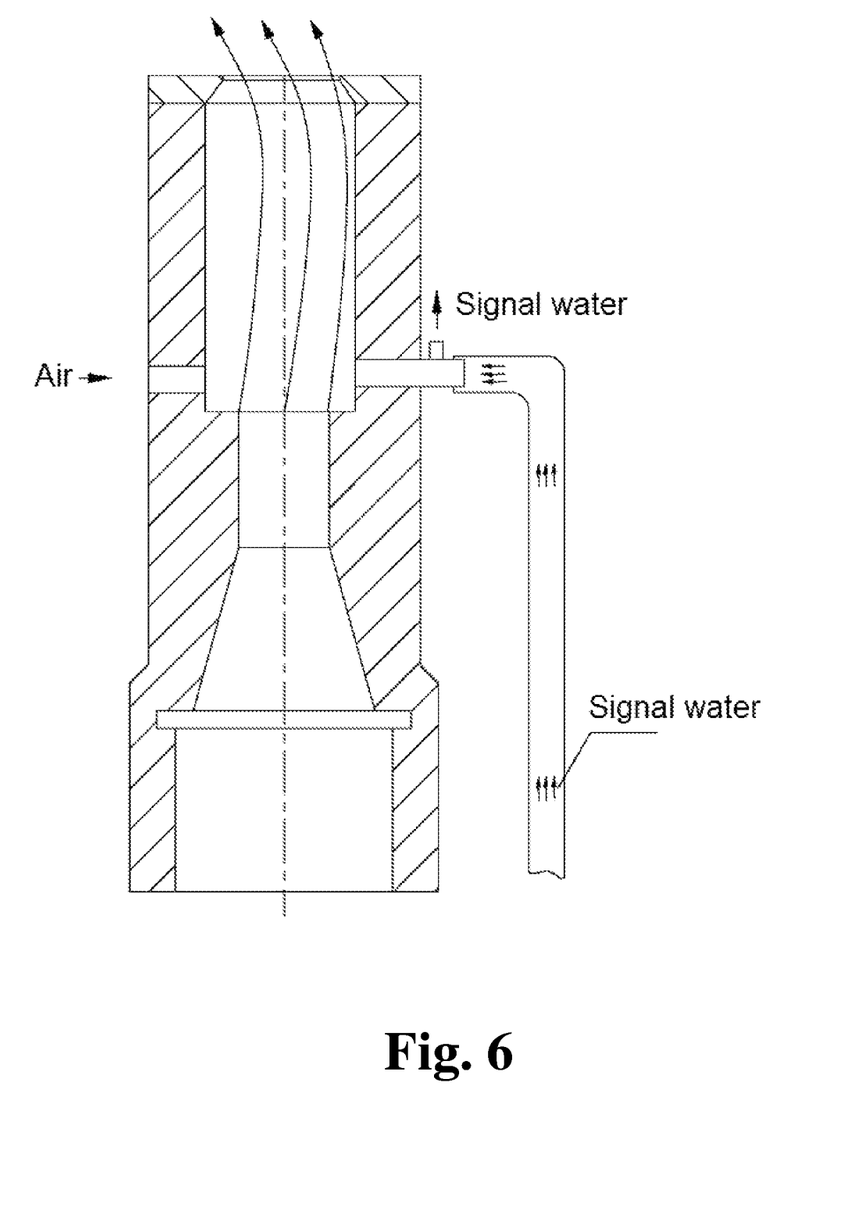
FIG. 6 is a schematic diagram of a wall attachment state of the fluidic element.

Stepping: as shown in FIG. 6, the signal water flows through the water inlet 8 via the conduit 15. At this time, the signal water blocks the second air supply pore 19, and no air is supplied from the right side of the fluidic element 7. As a result, a low pressure vortex area is generated on the right side, and the pressure on the left side is greater than that on the right side. Thus, the wall attachment of the main jet towards the right side occurs. The water flow impacts the chamfer of the outlet cover plate 10 and generates a driving force to drive the sprinkler head to rotate rightward in a stepping manner. At this time, the fluidic element 7 is in the wall attachment state, the main jet pumps out the signal water in the water tank 1 via the conduit 15, and air enters the second air supply pore 9 again. Consequently, the water flow restores the direct jet. In such a repeated cycle, the sprinkler head automatically completes the actions of direct jet, stepping and direct jet.

Figure 7:
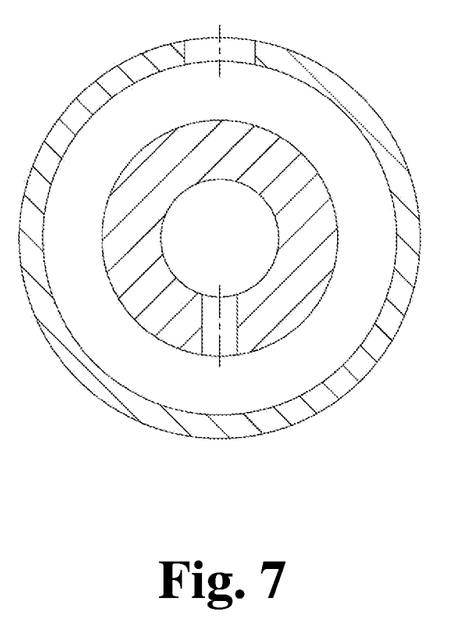
FIG. 7 is a schematic diagram when an included angle β between a water distributor and a signal hole is 180°.

In this embodiment, as the sprinkler 4 is in threaded connection to the water tank 1, by adjusting the connection position of the water tank 1, an included angle β between the water distributor 11 and the signal hole 17 may be in a range from 0° to 180°. As shown in FIG. 7, an embodiment in which the included angle β between the water distributor 11 and the signal hole 17 is 180° is provided: when in the direct jet state, the water distributor 11 may distribute signal water into the water tank 1 all the time, the signal water may flow into the signal nozzle 13 only when the water tank 1 is full, and then the signal water enters the water inlet 8 via the conduit 15. According to the working state of the fluidic element 7, the wall attachment of the water flow automatically completes the rotation of the sprinkler head. As the flow rate of the signal water at the water distributor 11 is constant, the wall attachment of the water flow occurs when the water tank 1 is full of signal water. Therefore, the duration of every time of direct jet of the sprinkler head is constant. Furthermore, as it is required to pump out a same amount of signal water during every time of wall attachment, the duration of every time of wall attachment of the sprinkler head is constant too. Thus, the uniform distribution of the stepping frequency is realized as a whole, and the problems that a sprinkler head has a stepping frequency not so uniform and may fail to take signal water to complete the rotation action are solved.

In the present invention, by increasing or decreasing the included angle β between the water distributor 11 and the signal hole 17, the regulation and control to the stepping frequency of a sprinkler head may be realized by two working states of increasing or decreasing the amount of the signal water required in a water container volume 16.

The process of increasing the included angle β between the water distributor 11 and the signal hole 17 is specifically as follows: the first locking nut 2 is loosened, the water tank 1 is rotated to increase the set angle of the included angle β, and then the first locking nut 2 is locked. It is to be noted that, when the included angle β between the water distributor 11 and the signal hole 17 increases, more signal water remains in the water tank 1 and then reaches the signal nozzle 13 to enter the water inlet 8 via the conduit 15. In this case, the duration of direct jet of the sprinkler head increases, more water needs to be pumped out during every time of wall attachment of the water flow. As a result, the duration of wall attachment of the sprinkler head increases, and the stepping frequency thus decreases.

The process of decreasing the included angle β between the water distributor 11 and the signal hole 17 is specifically as follows: the first locking nut 2 is loosened, the water tank 1 is rotated to decrease the set angle of the included angle β, and then the first locking nut 2 is locked. It is to be noted that, when the included angle β between the water distributor 11 and the signal hole 17 decreases, less signal water remains in the water tank 1 and then reaches the signal nozzle 13 to enter the water inlet 8 via the conduit 15. In this case, the duration of direct jet of the sprinkler head decreases, less water needs to be pumped out during every time of wall attachment of the water flow. As a result, the duration of wall attachment of the sprinkler head decreases, and the stepping frequency thus increases.

Embodiment 2

Figure 8:
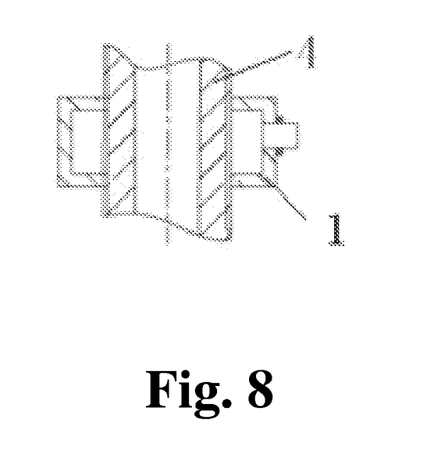
FIG. 8 is a schematic diagram of connection of core components according to Embodiment 2.
Figure 9:
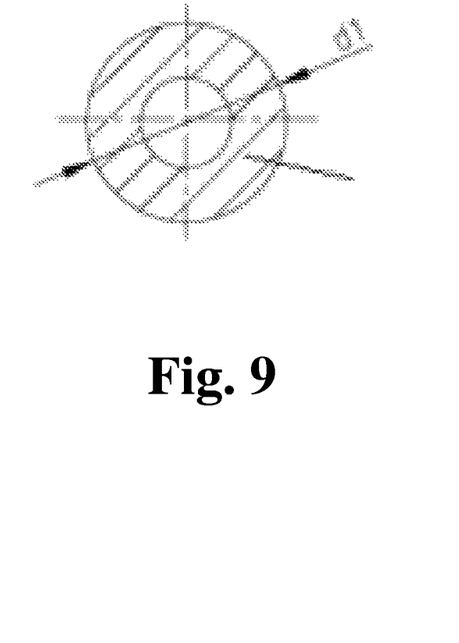
FIG. 9 is a structure diagram of a sprinkler according to Embodiment 2.
Figure 10:
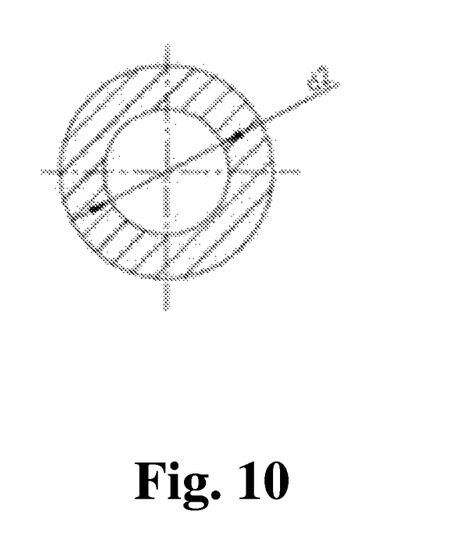
FIG. 10 is a structure diagram of a water tank according to Embodiment 2.

This embodiment is substantially the same as Embodiment 1: through holes are formed on both the upper and lower walls of the water tank 1. The only difference is that: as shown in FIG. 8, FIG. 9 and FIG. 10, in this embodiment, the through holes on both the upper and lower walls of the water tank 1 are brought to be in interference-fit connection to the outer sidewall of the sprinkler 4 by technical means. That is, the aperture d2 of the through holes formed on both the upper and lower walls of the water tank 1 is less than the diameter d2 of the outer sidewall of the sprinkler 4. In this way, it may be ensured that no leakage of water flowing from the water distributor into the water tank will occur.

Embodiment 3

Figure 11:
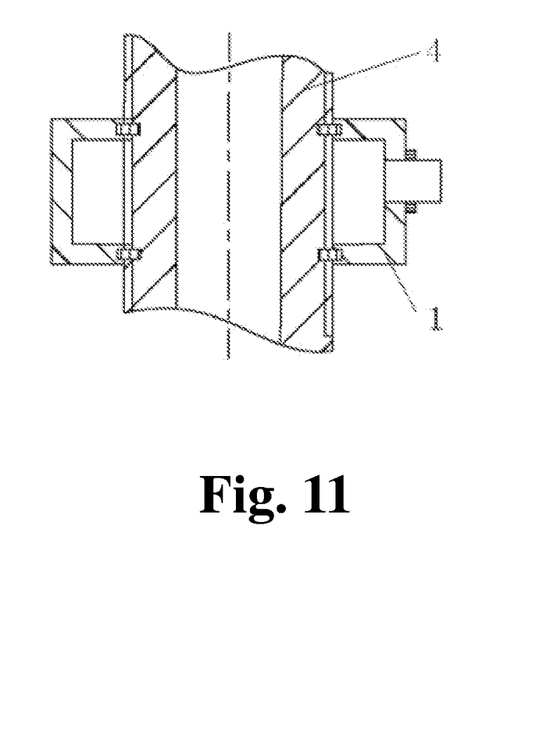
FIG. 11 is a structure diagram of core components according to Embodiment 3.
Figure 12:
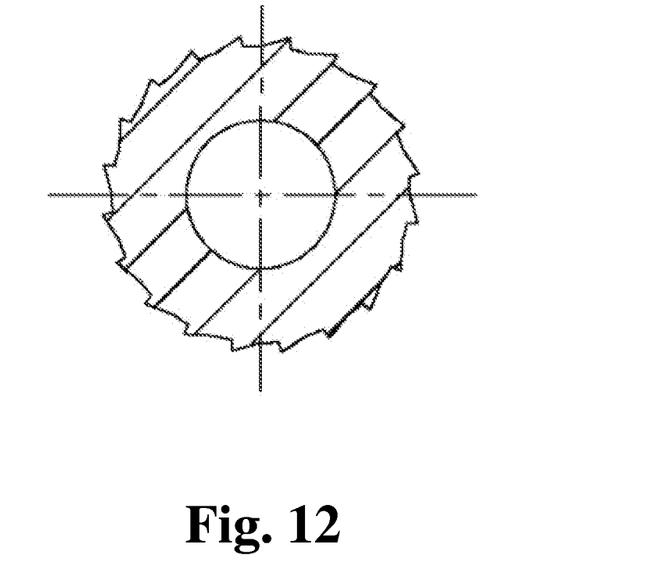
FIG. 12 is a structure diagram of a sprinkler according to Embodiment 3.
Figure 13:
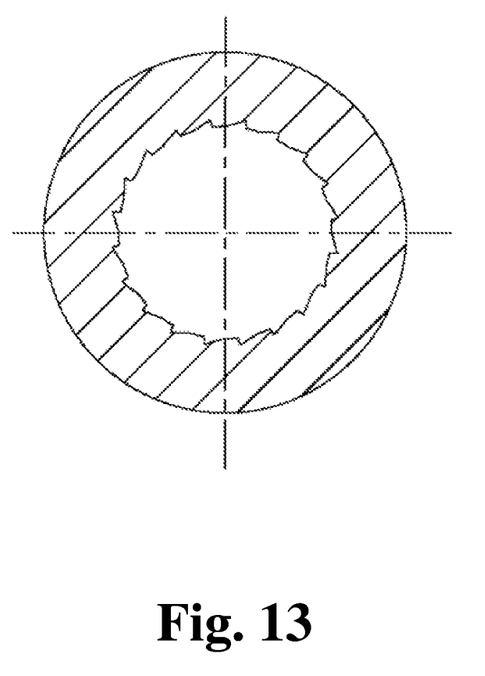
FIG. 13 is a structure diagram of a water tank according to Embodiment 3.

This embodiment is substantially the same as Embodiment 1: through holes are formed on both the upper and lower walls of the water tank 1. The only difference is that: limiting tooth slots are provided on the walls of the through holes on both the upper and lower walls of the water tank 1, and limiting teeth are correspondingly provided on the outer sidewall of the sprinkler 4, where the water tank is made of engineering plastics and the sprinkler is made of metal by means of smelting. Due to different hardness of the material of the water tank and the material of the sprinkler, the water tank 1 may be in firmly sealed connection to the sprinkler 4 via the limiting teeth by virtue of the elastic deformation of the plastics. In this way, water in the water tank 1 may be prevented from flowing outside the tank.

The direct jet and stepping states of the sprinkler head in both Embodiment 2 and Embodiment 3 are substantially the same as Embodiment 1, and will not be repeated here.

The objectives, technical solutions and beneficial effects of the present invention have been further described in details by the foregoing specific embodiments. It should be understood that, the foregoing descriptions are merely specific embodiments of the present invention, and are not intended to limit the present invention. Any modification, equivalent replacement and improvement made within the spirit and principle of the present invention shall fall into the protection scope of the present invention.

The invention claimed is:

1. An automatic control element with uniformly-distributed stepping frequency, comprising:
    a sprinkler (4);
    a fluidic element (7) connected to the sprinkler (4); and
    a water tank (1) disposed about an exterior of the sprinkler (4),
    wherein the fluidic element (7) further comprises an outlet cover plate (10) disposed on an outlet of the fluidic element (7), a water inlet (8) and a first air supply pore (9) are symmetrically arranged on the fluidic element (7), and a second air supply pore (19) is formed on the water inlet (8);
    wherein the sprinkler (4) comprises a water distributor (11), and the water distributor (11) is in communication with an inner cavity of the water tank (1);
    wherein the water tank (1) is in a shape of a hollow cylinder having a through hole along an axis thereof, and a signal nozzle (13) is affixed to an exterior of the water tank and the signal nozzle (13) is connected to the water inlet (8) via a conduit (15); and wherein the sprinkler is configured to receive water and output the water to the fluidic element directly, and send the water from the water tank to the water inlet.

2. The automatic control element with uniformly-distributed stepping frequency according to claim 1, wherein the water distributor (11) is in an inclined straight shape, and a diameter of the water distributor (11) is 1/10 to 1/4 of that of a diameter of a center hole of the sprinkler (4).

3. The automatic control element with uniformly-distributed stepping frequency according to claim 2, wherein an angle α from a hole center line of the water distributor (11) and a hole center line of the sprinkler (4) downstream of the water distributor is less than or equal to 90°.

4. The automatic control element with uniformly-distributed stepping frequency according to claim 1, wherein the exterior of the sprinkler (4) has threads, wherein the water tank (1) is threaded to the sprinkler (4).

5. The automatic control element with uniformly-distributed stepping frequency according to claim 4, wherein a sealant is coated on a connection between the water tank (1) and the sprinkler (4).

6. The automatic control element with uniformly-distributed stepping frequency according to claim 4, wherein a first locking nut (2) is threaded onto the sprinkler (4) to secure the water tank (1) in one location on the sprinkler (4).

7. The automatic control element with uniformly-distributed stepping frequency according to claim 5, wherein the signal nozzle (13) is threaded to the water tank (1), and a third locking nut (14) locks the signal nozzle (13) onto the water tank (1).

8. The automatic control element with uniformly-distributed stepping frequency according to claim 5, further comprising a second locking nut (5) disposed about a connection between the sprinkler (4) and the fluidic element (7).

9. The automatic control element with uniformly-distributed stepping frequency according to claim 1, wherein the water tank (1) is disposed about the exterior of the sprinkler (4) by an interference fit.

10. The automatic control element with uniformly-distributed stepping frequency according to claim 9, wherein the signal nozzle (13) is threaded to the water tank (1), and a third locking nut (14) locks the signal nozzle (13) onto the water tank (1).

11. The automatic control element with uniformly-distributed stepping frequency according to claim 9, further comprising a second locking nut (5) disposed about a connection between the sprinkler (4) and the fluidic element (7).

12. The automatic control element with uniformly-distributed stepping frequency according to claim 1, wherein limiting tooth slots are provided on an edge of an upper wall and an edge of the lower wall alongside the through hole of the water tank, limiting teeth are provided on the exterior of the sprinkler (4), the water tank (1) is fixedly connected to the sprinkler (4) via the limiting teeth.

13. The automatic control element with uniformly-distributed stepping frequency according to claim 12, wherein the water tank (1) is made of a plastic, and the limiting teeth on the sprinkler (4) are made of metal.

14. The automatic control element with uniformly-distributed stepping frequency according to claim 12, wherein the signal nozzle (13) is threaded to the water tank (1), and a third locking nut (14) locks the signal nozzle (13) onto the water tank (1).

15. The automatic control element with uniformly-distributed stepping frequency according to claim 13, further comprising a second locking nut (5) disposed about a connection between the sprinkler (4) and the fluidic element (7).

16. The automatic control element with uniformly-distributed stepping frequency according to claim 1, wherein a chamfer is formed at an outlet of the outlet cover plate (10), and a shape of the outlet of the outlet cover plate (10) is square, circular, elliptic, or ovaloid.

* * * * *